May 23, 1939.
G. A. BOSWIN
REEL
Filed Sept. 16, 1937
2,159,469
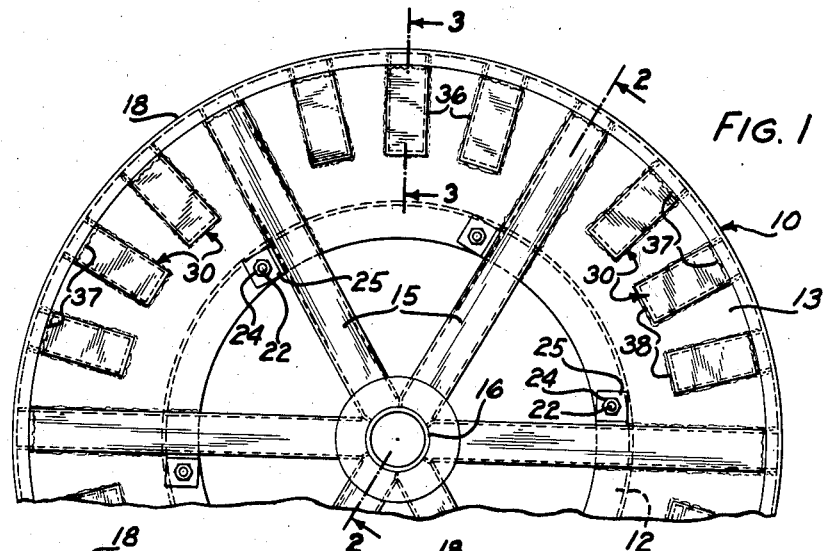
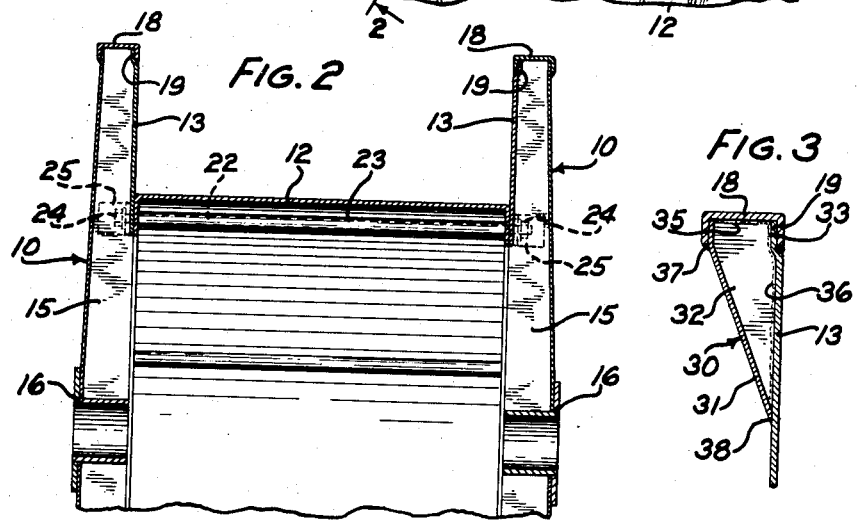
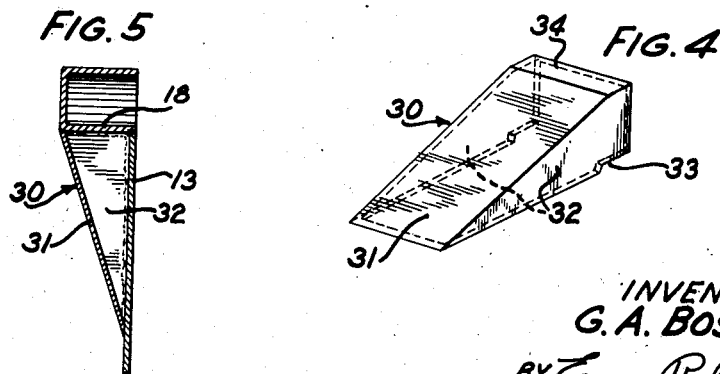
INVENTOR
G. A. BOSWIN
BY Emery Robinson
ATTORNEY Patented May 23, 1939

2,159,469

UNITED STATES PATENT OFFICE 2,159,469

REEL

George A. Boswin, Chicago, Ill., assignor, by mesne assignments, to Western Electric Company, Incorporated, New York, N. Y., a corporation of New York Application September 16, 1937, Serial No. 164,156

2 Claims. (Cl. 242—77)

This invention relates to reels, and more particularly to reels for supporting heavy material such as telephone cable and the like.

An object of the invention is to provide an inexpensive and durable reel having the greatest degree of strength commensurate with its weight.

In accordance with one embodiment of the invention, a cable reel is provided comprising a pair of metallic heads and a metallic drum therebetween, each head comprising an annular plate, radial spokes secured to the plate, a rim encircling the plate and spokes and welded thereto, and reinforcing means in the form of a plurality of separated wedge shaped channels welded to the plate and to the underside of the rim between adjacent spokes.

A more complete understanding of the invention may be had by referring to the following detailed description, in which reference is made to the accompanying drawing, wherein:

Fig. 1 is a fragmentary side elevational view of a cable reel embodying the features of the invention;

Fig. 2 is a fragmentary sectional view taken on line 2—2 of Fig. 1;

Fig. 3 is an enlarged fragmentary sectional view taken on line 3—3 of Fig. 1;

Fig. 4 is a perspective view of one of the reinforcing elements, and

Fig. 5 is a fragmentary sectional view similar to Fig. 3, showing an alternative construction embodying the invention.

Referring now to the drawing, it will be seen that the invention is illustrated therein as embodied in a cable reel comprising a pair of metal heads 10, 10 spaced apart by a flanged metal drum 12. Each of the heads comprises an annular plate 13 having a center opening of a diameter equal to the openings in the flanged ends of the drum. A plurality of reinforcing ribs or spokes 15, 15 are secured, preferably by welding, to the outside surface of the annular plate 13. These spokes are disposed radially of the annular plate and extend from the outer periphery of the plate to a flanged center tube or hub member 16 to which the spokes are secured at their inner ends, preferably by welding.

In the illustrated embodiment of the invention, the spokes are of sheet metal channel construction and are of tapering depth, being somewhat deeper at their inner ends than at their outer ends. Also, the channel spokes preferably are secured to the annular plate with their web or base portions spaced from the plate, as shown.

An annular rim or tread 18 encircles the annular plate 13 and the outer ends of the spokes 15 and is secured to the plate and spokes, preferably by welding. In the construction shown in Figs. 1 to 3, inclusive, the rim is of channel cross section with the open side of the channel facing inwardly toward the hub member 16 so that the flanges of the channel rim embrace the outer ends of the spokes and the outer peripheral edge of the annular plate 13, as shown. The outer peripheral edge portion of the annular plate which extends into the channel rim is outwardly offset, as indicated at 19, and the adjacent end portions of the spoke flanges are correspondingly notched so that when the rim is welded in place the outer surface of the inner flange thereof is substantially flush with the inner surface of the annular plate, thereby providing a substantially smooth surface on the inside of the head for the cable storage space of the reel.

The heads may be secured to opposite ends of the drum in any suitable manner, but in the illustrated preferred embodiment of the invention through bolts 22, 22 with tubular separators 23, 23 are employed. The tubular separators extend between the end flanges of the drum, which together with the annular plates 13 are secured against the ends of the tubular separators by means of lock-type nuts 24, 24 threaded on the ends of the through bolts. Reinforcing angle plates 25, 25 are welded to the annular plates 13 and to the flanges of the adjacent spokes 15 so as to reinforce the annular plate portions through which the through bolts pass.

In accordance with a feature of the present invention, a series of separated reinforcing elements or gussets 30, 30 are provided under the rim 18 between the outer ends of the spokes. These reinforcing gussets are preferably in the form of tapered or wedge shaped channels formed from sheet metal and are secured to the annular plate 13 radially thereof and with their deeper ends flush with the outer edge of the plate. In the illustrated embodiment of the invention three reinforcing gussets are provided between each pair of adjacent spokes 15, and it will be seen that the gussets are substantially equidistantly spaced from each other as well as from the spokes 15. However, the number of reinforcing gussets may be varied according to the strength required.

Each of the reinforcing gussets comprises a base or web portion 31 and triangular or wedge shaped side flanges 32, 32. In the embodiment of the invention illustrated in Figs. 1 to 4, inclusive, the side flanges are notched, as indicated at 33, to fit the offset outer edge 19 of the annular plate 13; and the upper end 34 of the web portion 31 opposite the notches 33 is formed to fit tightly on the inside of the outer flange of the channel rim 18. The reinforcing gussets are secured to the annular plate 13 and to the rim 18, preferably by welding. The upper end edges of the side flanges 32 of the reinforcing gussets are welded to the underside of the rim, as indicated at 35 (Fig. 3), and the side edges of the flanges are welded to the outer side of the annular plate 13, as indicated at 36. Also, the web portion 31 of each reinforcing gusset is welded near its upper end to the edge of the outer rim flange, as indicated at 37 and at its bottom edge to the annular plate 13, as indicated at 38.

In the embodiment of the invention illustrated in Fig. 5, the channel rims 18 are positioned to receive the ends of suitable lags (not shown) for enclosing the cable storage space of the reel. In this embodiment of the invention, the reinforcing gussets have the upper edges of their web portions 31 and the upper edges of their side flanges 32 welded to the under side of the bottom flange of the channel rim 18.

It will be obvious that the reinforcing gussets, when properly welded in position with their flanges 32 disposed radially of the annular plate 13 and at right angles thereto, will brace and stiffen the rim portions intermediate the spokes 15. The length of the reinforcing gussets may vary, of course, according to the strength desired, but it has been found that with reinforcing gussets of a length approximately three fourths the width of the annular plate 13 the strength and impact resistance of the head between the spokes 15 approximates the strength and impact resistance at the ends of the spokes. Also, by employing the reinforcing gussets between spokes, the number of spokes may be reduced, and the annular plate as well as the spokes may be formed of sheet metal of lighter gage than heretofore employed, so that while the required strength and rigidity are maintained, the weight of the reel is reduced considerably, thereby reducing handling and shipping costs.

It is to be understood that the invention is not limited to the illustrative embodiments thereof herein described, except insofar as is defined by the appended claims.

What is claimed is:

1. In a reel, a head comprising an annular plate, radial spokes secured to said plate, a rim encircling the plate and spokes and welded thereto, and reinforcing means comprising a plurality of spaced apart tapered channels welded to the annular plate radially thereof and with their deeper ends contacting an inner surface of the rim, said reinforcing channels being of a length substantially less than the width of said annular plate.

2. In a reel, a head comprising a tubular hub, an annular plate surrounding the hub, radial spokes secured to said hub and plate, a rim encircling the plate and spokes and welded thereto, and a plurality of separated reinforcing members equidistantly spaced from each other in each of the spaces between adjacent spokes, said reinforcing members comprising tapered channels of a length substantially less than the width of said annular plate, said channel members being welded to said annular plate radially thereof and with the deeper ends of the channels contacting an inner surface of the rim.

GEORGE A. BOSWIN.